United States Patent [19]

Waldron et al.

[11] Patent Number: 5,226,160
[45] Date of Patent: Jul. 6, 1993

[54] METHOD OF AND SYSTEM FOR INTERACTIVE VIDEO-AUDIO-COMPUTER OPEN ARCHITECTURE OPERATION

[75] Inventors: James J. Waldron, Braintree; Richard L. Ginga, Worcester; Steven G. Corcoran, Waltham, all of Mass.

[73] Assignee: Visage, Framingham, Mass.

[21] Appl. No.: 381,294

[22] Filed: Jul. 18, 1989

[51] Int. Cl.⁵ ............................................. G06F 9/06
[52] U.S. Cl. ............................ 395/650; 364/DIG. 1; 364/281.3; 364/236.2; 364/237.3; 364/239.4
[58] Field of Search ... 364/200 MS File, 900 MS File; 395/650

[56] References Cited

U.S. PATENT DOCUMENTS

| | | | |
|---|---|---|---|
| 4,589,063 | 5/1986 | Shah et al. | 395/275 |
| 4,835,685 | 5/1989 | Kun | 364/200 |
| 4,855,905 | 8/1989 | Estrada et al. | 364/200 |
| 4,931,950 | 6/1990 | Isle et al. | 366/DIG. 1 |
| 4,975,829 | 12/1990 | Clarey et al. | 364/200 |

OTHER PUBLICATIONS

V. Exec Reference Guide, Software Version 3.2, Document Version 1.0, Sep. 1, 1989.
IBM Info Window Control Program, "Progammer's Guide", Oct. 1986.

Primary Examiner—Thomas M. Heckler
Attorney, Agent, or Firm—Rines and Rines

[57] ABSTRACT

An interactive video-audio-computer open architecture system and method with dynamically reconfigurable software providing a virtual device interface buffering applications from hardware and with extended flexibility and universal compatibility with the myriad of industry hardware products and standards (videodisc players, graphics, microprocessors, computers, video and audio sources, etc.), all with transparency to the user and without the requirement of modification of application software irrespective of which hardware product is connected to the system.

22 Claims, 5 Drawing Sheets

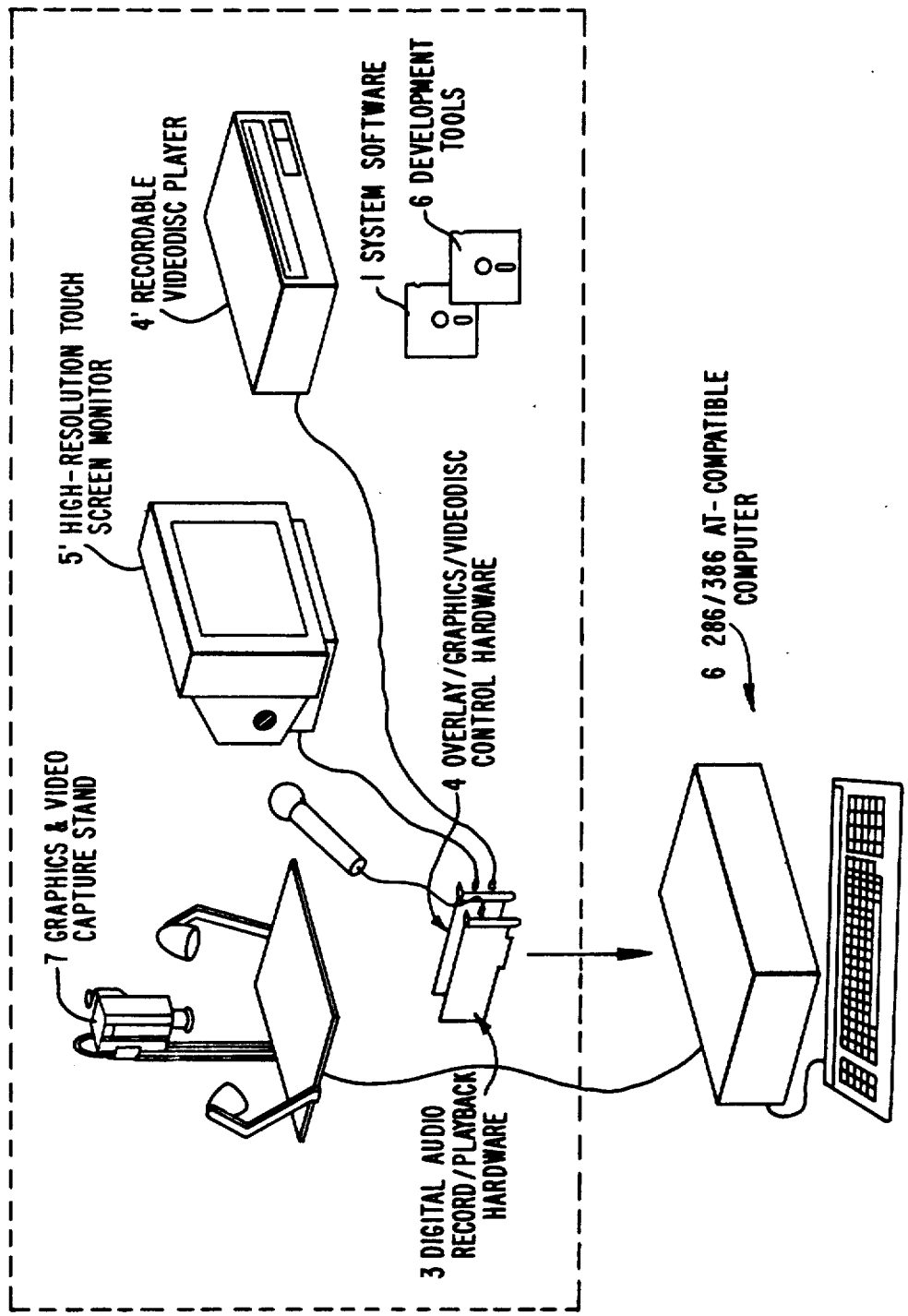

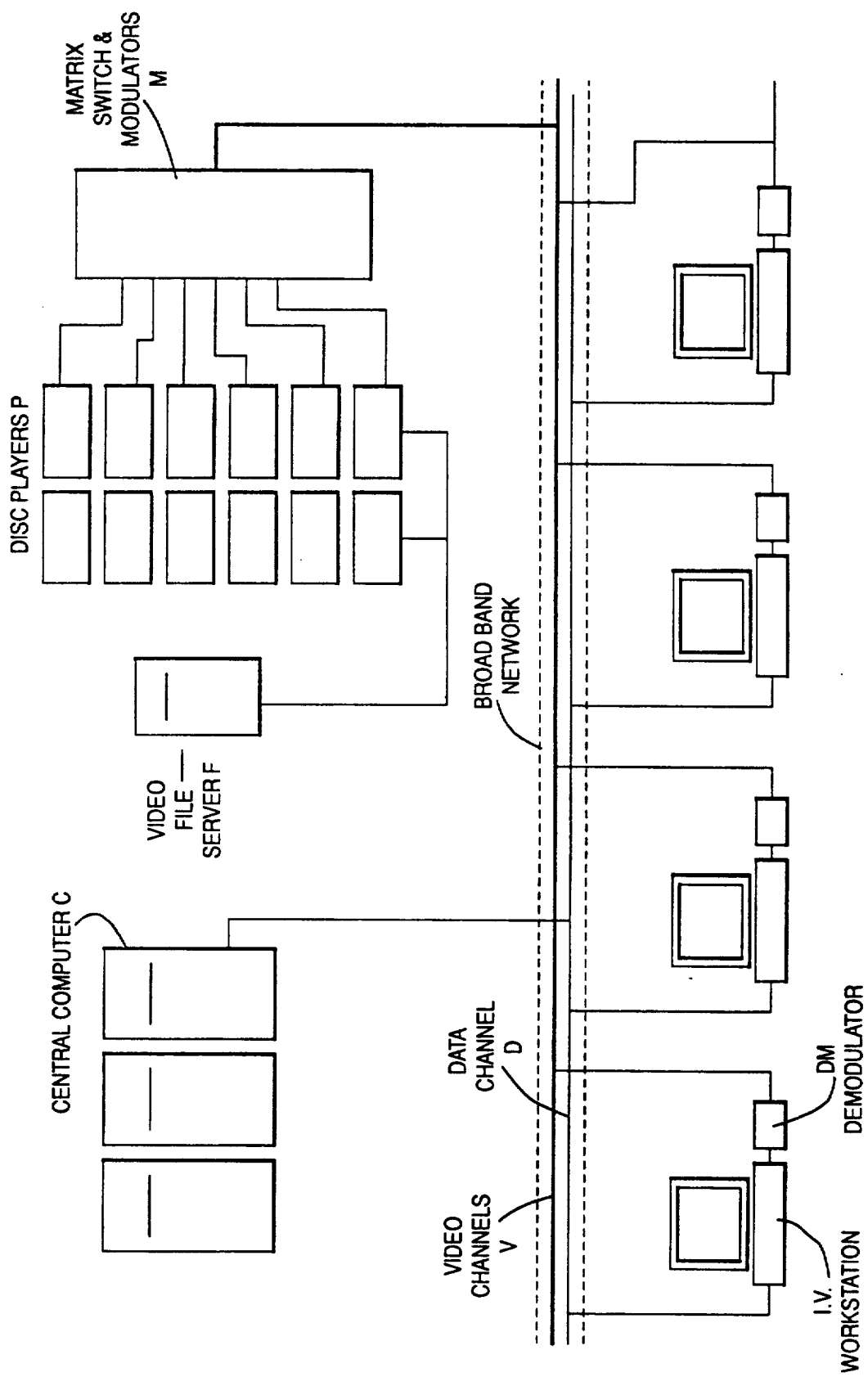

METHOD OF AND SYSTEM FOR INTERACTIVE VIDEO-AUDIO-COMPUTER OPEN ARCHITECTURE OPERATION

The present invention relates to interactive multimedia information systems and methods, being more particularly directed to interactive video systems that unite laser videodisc players, PAL and NTSC videodisc players generally, write-once video disc systems, digitized images and graphics, digitized audio and microcomputers compatible with IBM and other systems, and in an open architecture software-control flexible and compatible manner.

BACKGROUND OF INVENTION

Open architecture systems of this general character have been provided to some degree in prior systems such as the IBM "InfoWindow" described, for example, in the IBM Control Program Programmer's Guide, 1st Edition; the Sony "View II" system; and earlier systems of the assignee of the present application, Visage Inc., prior to the present invention described in its V-EXEC Reference Guide. The IBM system above-referenced, however, is a closed system with limited videodisc player options; it is not viable for other computer manufacturers' equipment; and it has no PAL support, among other weaknesses from the universal interactive open architecture point of view. The Sony system is also a closed system; it is not industry-graphics compatible; and it has limited software support and no PAL support. The earlier systems of Visage Inc. are also limited in software and functional support.

In accordance with the present invention, techniques have been found for significantly extending the capabilities of the latter systems, with the computer application interface simplified and made accessible to any application program, with the structure modularized, allowing future enhancements to be made more easily and changes to be localized to one module, and with the dynamic loading of functional modules minimizing the size in memory to only that which is necessary for the services requested. The invention, moreover, frees program developers from the constraints of the hardware configurations on which their application program will eventually be run, providing a "virtual" device interface for players and input devices and a migration path for advanced technologies, integrating industrial hardware components into a unified system, and all with presently unattainable flexibility and compatibility in interactive video systems for developers and users.

An object of the present invention, accordingly, is to provide, unlike prior art devices including those above-described, a new and improved and significantly more universal open architecture interactive video-audio-computer method of operation and system, with vastly extended flexibility and compatibility with the myriad of industry hardware standards (video disc players, microprocessors and computers, graphics, etc.) and supporting such components with system software which buffers or insulates applications from the hardware, allows users to optimize system refinements without being restricted to any particular vendor's proprietary technology and without obsoleting earlier component investments, and all with transparency to the user.

The software and its resulting functions underlying the invention, moreover, controls videodisc players, communicates the input/output requirements, manages overlay of computer graphic files and links to third party software to incorporate these capabilities into those products. The invention, furthermore, provides universal videodisc player control which means that players can be changed without requiring a modification to the application software because the system dynamically reconfigures itself.

The invention, furthermore, in its virtual interface approach, applies to input (X/Y) devices, as well—and all the above-named functions and hardware communications issues associated with the various devices are attained with transparency to the user. In addition, the flexibility is added to provide not only universal video disc control command, but also a universal set of X/Y input commands as well, which allow device changes without resulting application programs.

Multiple device types, in accordance with the extended features of this invention, may be used simultaneously, if desired. Further advanced features include additional commands not available on some players which will work on all players; support of digital audio facility; fast loading of high density graphics files; programming language interfaces; and support of PAL and NTSC videodisc players, among others.

As implemented in preferred form, the technique and system of the invention involve discrete modules of function libraries which are dynamically loaded at run-time, reducing memory overload requirements by using only the functionality required to run the application. An intelligent system software layer optimizes performance of data-intensive tasks, such as graphics and digital audio, meaning, for example, that loading graphics, responding to touch (touch screens), and loading audio can occur simultaneously.

Thus the invention opens the door to a new era where its particular open architecture approach to interactive video systems is consistent with current market demand for non-proprietary solutions, affording users the ability to use components from different vendors, a migration path to new techniques, and an assurance that large numbers of applications will run on their systems today and in the future.

Other and further objects of the invention will be explained hereinafter and are more particularly pointed out in connection with the appended claims.

SUMMARY OF INVENTION

In summary, from one of its important points of view, the invention embraces a method of interactive video-graphics-audio-computer open architecture operation, that comprises, providing a modular insulating or buffering software layer between applications and the hardware required for performing the same, including establishing discrete modules of function which are dynamically loaded at run-time; optimizing the performance of data-intensive tasks, such as loading graphics, audio, video and computer information and responding to touch screens and other input information by restricting such loading to substantially only the functionality required to run the specific application or task; and providing control through such software as a virtual-device interface that dynamically reconfigures itself to integrate the respective particular types of hardware videodisc players, computers, graphics files, X/Y inputs and links to external software without requiring modification to the application software. Preferred and best mode embodiments are hereinafter presented in detail.

DESCRIPTION OF DRAWINGS

The invention will now be described with reference to the accompanying drawings, FIGS. 1A and B of which are block component and system diagrams illustrating the interfacing of the invention with a typical interactive so-called display "engine" video system and a captive "engine" system, respectively;

FIG. 2 is a block diagram of a typical networked interactive video system useful with the invention;

DESCRIPTION OF PREFERRED EMBODIMENT

Figure 1A:
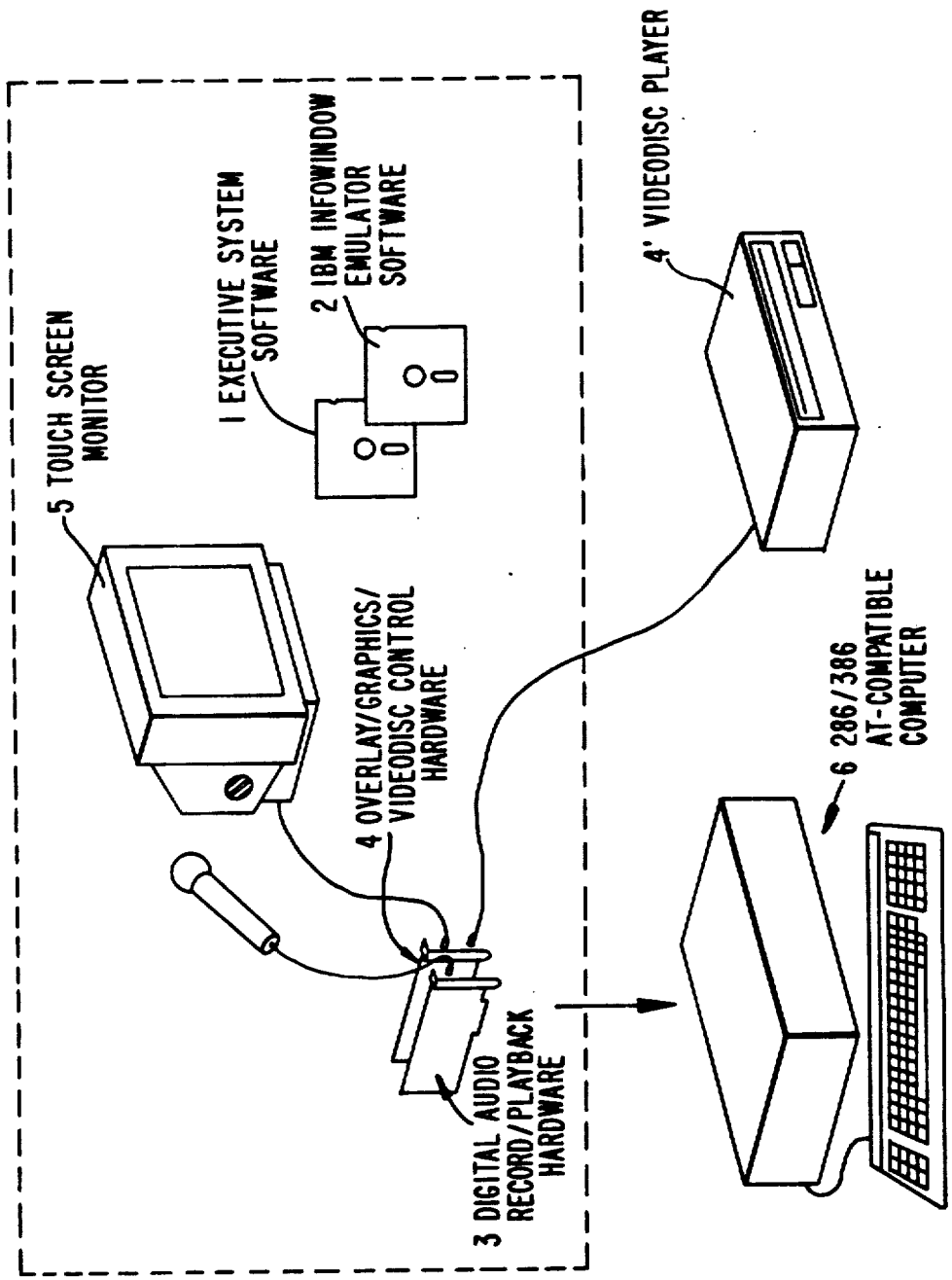

As schematically shown in FIG. 1A, the new Executive System software 1 of the invention, as well as an IBM "InfoWindow" emulator 2, is shown provided for controlling or interfacing a touch screen monitor 5, an overlay/graphics/video disc control hardware component 4 connected with a videodisc player 4' (such as, for example, of the type described in copending application Ser. No. 313,758 of the assignee herein, entitled "Method of and Apparatus for Controlling Relative Graphic-to-Video Registration or Position and Scan Size in Overlayed Graphics and Video Cathode-Ray-Tube Screen Display", filed Feb. 22, 1989, and the publications referred therein), digital audio record/playback hardware 3, and a compatible computer, illustrated as, for example, a type 286/386 AT. In FIG. 1B, a captive version is illustrated using a graphics and video captive stand 7 for recording such image information, a high-resolution touch screen monitor 5, a recordable video disc player 4' and further software development tools at disc 6.

A useful networked interactive video system is shown in FIG. 2 wherein interactive video work stations "I.V." are connected with video channel and data channel signal lines V and D, with broadband network connections to a control computer C and matrix switch and modulators M feeding appropriate I.V. station demodulators DM, with video signals from disc players P with their video file server F.

As before stated, unlike earlier partially interactive video systems, the proprietary system software of the invention provides a modular insulating layer between applications and hardware, allowing users to change their hardware configuration without changing their applications. This "virtual" device layer permits the system to work with nearly any input device: touchscreen 5, a mouse, or videodisc players 4-4' from many different manufacturers, digital audio sources 3, computers 6, etc., and all with the same application code. The real benefit of this approach is protection of the user's investment both in applications and in hardware; and the flexibility and power of the system software make it possible for the development of software emulators which permit applications designed on other systems to run unmodified on the system of the invention. This feature gives the invention a crucial advantage: not only does it permit the broadest, most flexible, and most complete system operation, but it can also run more types of applications than any other system previously known.

Figure 3:
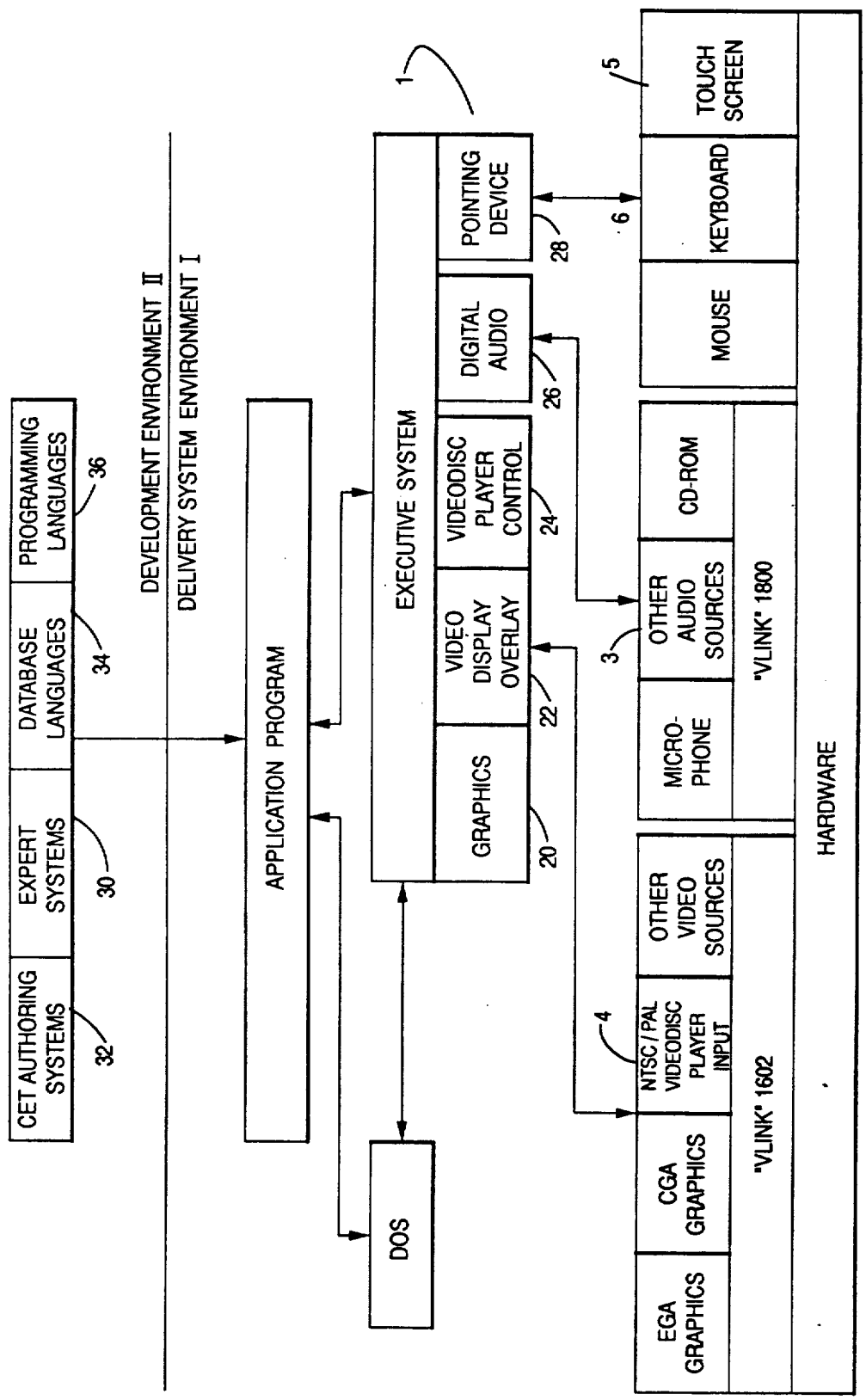
FIG. 3 is a similar diagram illustrating the software and functional controls of the invention interfacing with multimedia components.

In FIG. 3, the System 1 with its graphics 20, video display/overlay 22, videodisc player control 24, digital audio and monitor screen pointing device controls 26 and 28, respectively, so-labelled, is shown interfacing with NTSC/PAL videodisc player input 4 (or other video sources) such as, for example, the type 1602 of the said assignee described in bulletin "V:LINK 1602", the audio source 3 as of the type 1800, described in bulletin "V:LINK 1800", and the touch screen 5 or keyboard or mouse pointing device. This is part of the delivery system environment I, interfacing with the development environment II of expert systems 30, CET authoring systems 32, and database or programming languages 34 and 36, so-labelled, as is well known.

Figure 4:
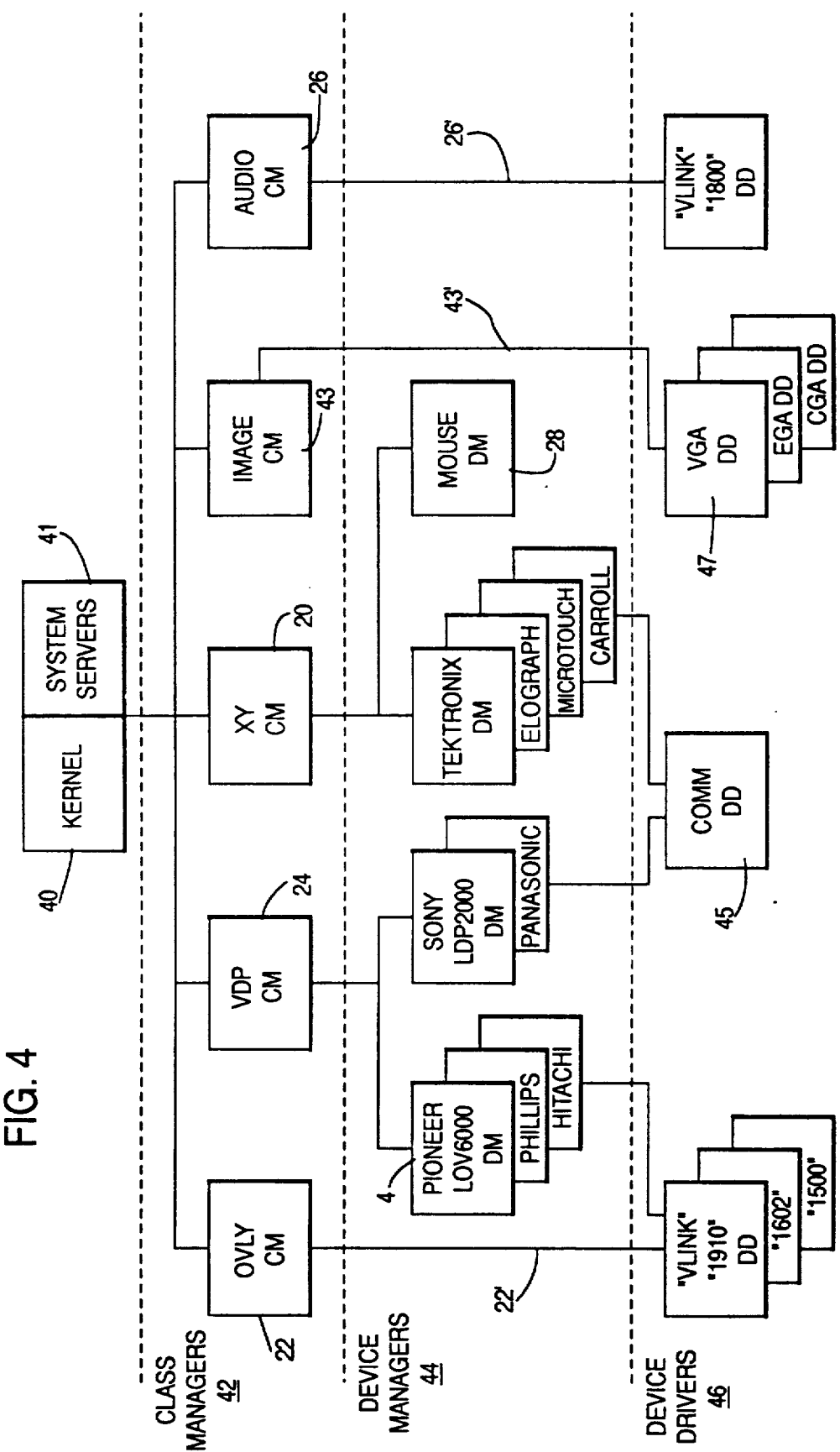
FIG. 4 is an overall block diagram of the system of the invention, shown universally usable with numerous components of different manufacturers.

It is now in order to detail the components of a practical and illustrative Executive System 1 that enables the above-described functions to occur, and this will be done more particularly by reference to FIG. 4 showing the structure, configuration, program use-interfaces and internal processing of the System 1.

Turning first to the structure of FIG. 4, it is basically a 2-dimensional matrix of modules, with each module capable of communicating with any other module in the same way, and with each row representing a layer of functionality with the highest row controlling the interface with other programs. The lowest row controls the particular device. Each column represents a category of services, but not all elements of the matrix may be filled.

MODULES—Each of the elements of the matrix is built as an executive file. The modules tend to communicate with the modules directly above and below them, though they are able to communicate with any other module. The columns in the matrix represent different service classes and are individually selectable by the application. The rows in the matrix are logical layers of functionality called the KERNEL 40, the CLASS MANAGER 42, the DEVICE MANAGER 44, and the DEVICE DRIVER 46, though not all layers in a CLASS may be needed to supply the services.

CLASSES—There may, for example, be six service classes. These are shown as SYSTEM SERVICES 41, OVERLAY SERVICES (OVLY), VIDEODISC PLAYER SERVICES (VDP), XY SERVICES (XY), IMAGE SERVICES, AND DIGITAL AUDIO SERVICES (AUDIO). Each of these classes can be selected by the application except SYSTEM SERVICES 41 which is always loaded.

KERNEL 40—This layer provides generic utility functions for use by all other modules. These include memory and queue management, realtime event services, configuration information, interrupt services, communication and device information. This level also communicates with the application program and dispatches requests to the CLASS MANAGERS 42.

CLASS MANAGERS 42—This layer passes the requests from the application. It checks the syntax of the parameters and may process some requests itself and return to the kernel. Most often, it issues some requests to the module below. An exception to this rule is the IMAGE class where the class manager 43 is also responsible (43') for reading and writing the image disk files. There is always a CLASS MANAGER that exists for each class—the OVERLAY (OVLY) at 22, the VIDEODISC PLAYER (VDP) at 24, the XY at 20, and the DIGITAL AUDIO at 26.

DEVICE MANAGERS 44—This layer controls a specific external device in the system. External devices are devices that are not present within the computers.

Internal devices are devices that are memory or I/O mapped. External devices are videodisc players 4 (such as of Pioneer, Phillips, Hitachi, etc.), touch screens 5 (such as of Tektronix, Elographics, Microtouch, Carroll, etc.), mouse devices 28, and the before-described "V-Link" 1800 onboard processor. Modules compose commands and process responses from the devices though some classes do not have DEVICE MANAGERS.

DEVICE DRIVERS 46—This layer controls the specific internal device and is in the form of overlay boards (OVLY class manager 22 connected at 22' to "V:LINK" 1910, or 1602 of FIG. 3 or 1500 of Visage which also connects to the video disc players 4), the RS232 communication ports (COMM) 45, the graphics adapter (VGA) 47, and communication with the before-described "V:LINK" 1800 board of FIG. 3, which connects at 26' to the digital audio class manager 26. This is the device-dependent layer where the System 1 communicates with devices through I/O and memory mapped registers and interrupts. Some classes do not have DEVICE DRIVERS.

The configuration of the particular modules loaded when the system is run is dependent on the service classes selected by the application and the devices installed in the system. In successful and practical implementations of the systems of FIGS. 1-4, software has been created involving various files, entry and management functions found particularly useful for achieving the operation underlying the invention, and which may be summarized as follows as illustrative directions for programmers embodying preferred techniques therefor.

SOFTWARE AND PROGRAMMING INSTRUCTIONS

Such software implementation has involved, first, several useful files or tables:

DEVICE.TBL—This file (ascii) defines the devices installed in the system. It specifies their I/O address, interrupt number, DMA channel, video player name and connection (such as those at 4 in FIG. 4), graphics adapter type, and communication parameters (baud rate, start bits, stop bits, and parity). There is only one DEVICE.TBL file required in a system.

SERVICE.TBL—This file defines the services classes required by the application. It specifies the service class and the specific device (video disc player 4 or X/Y device 20, etc.). There can be one such service table.

PARSETBL.EXE—This program is loaded by the before-described KERNEL 40 as soon as it starts and passes the DEVICE and SERVICE tables described immediately above, and builds a structure for the KERNEL 40 defining which modules should be loaded and where to establish communication links.

NAMEVERS.DAT—This file contains the .EXE file names and the version for each module installable. The KERNEL 40 uses the structure supplied by PARSETBL and NAMEVERS.DAT to find and validate each module.

VCONFIG.EXE—This program is run when the software is initially installed on the system. It determines which devices are installed in the system, queries the user for video disk player name, calibrates the touch screen 5 if necessary, and request some optional information.

Considering the interfaces of the System 1, applications call directly by building a PACKET, later defined, placing a packet address in the ES:BX registers, and issuing a SOFTWARE INTERRUPT, described below. Modules build packets in the same format as applications, but the packet's address is passed on the stack and calling module issues an indirect call to pass control to the other module.

SOFTWARE INTERRUPT—The default software interrupt is 66 hex, and it is configurable by setting an environment variable to the desired hex interrupt. It is advised to use interrupt between 60 and 66 hex as these are reserved for this use.

PACKET—The before-mentioned packet is used to transfer all information between the application and the System 1 or between modules within the same. There is a fixed portion of the packet which is common to all requests and there is a variable portion specific to each command. A useful packet format is:

SERVICE CLASS—The service class is, for example, 0,1,2,3,4, or 7.

DEVICE ID—The device is 0-4.

REQUEST—This is the command number.

REQUEST STATUS—This is the result of the command returned by the system.

PARAMETERS—32 words of parameter information specific to the request.

INFOWINDOW EMULATOR—The INFOWINDOW emulator translates calls from the application into calls to the System 1. It may be a TSR like the System 1. Applications call INFOWINDOW by placing information in registers and issuing INT 7F. The emulator is basically made up of two parts. One part processes application requests and issues responses. This part does little but turn around and issue requests and return responses. The other part periodically "wakes up" and examines the video disc player 4 or the touch screen 5 and records the results for use with some commands. The emulator uses the system services to "wake up".

MIC EMULATOR—An MIC emulator may be provided in the form of a DOS Device Driver. It can translate MIC commands into system commands. It is installed at boot time through the CONFIG.SYS file. Applications would call the emulator by issuing DOS calls.

All modules internal to the System 1 execute in the same environment. Each module is compiled as a small model C program. Each has a single code segment and single data segment. All modules run on the same stack. There is also a global, rigidly defined, data area for information sharing.

Communication links between modules are established by the KERNEL 40 kernel when each module is loaded. Within each module is a table of four link structures. Each structure contains four addresses of four entry points into a module and the DEVICE ID to be used. The KERNEL 40 finds this table in the module and, by referring to the structure created by the previously described PARSETBL.EXE, fills in the addresses of the other modules that this one must "talk" to.

The four entry points may be defined as INIT, ENTRY, and two reserved. The INIT entry point is called by the KERNEL 40 once just after it loads the module and once when the system is being removed from memory. The load time call is meant to be used by the module to perform any initialization necessary, such as memory allocation, device activation, etc. Conversely, the remove time call is meant to be used to deallocate memory, idle devices, etc.

The ENTRY point is used for all requests among modules. The far address of a packet is pushed on the stack and a far indirect CALL is issued using the correct structure in the table.

The system KERNEL 40 provides a large set of services available to all modules. The code for these services resides within the kernel module, and other modules issue CALLS to invoke them. To use a service, the module simply calls the service wherever it needs to within its code. When the module is linked, a special library is searched that resolves all the references made. Each library routine that is selected is grouped together into a table. The KERNEL 40 finds this table when it loads the module and fills in the final addresses of the the requested routines from within the kernel's own code segment. Each table entry is a far JUMP to this address. System services exist in the preferred impelentation in the following areas:

MEMORY MANAGEMENT—The KERNEL 40 manages a memory segment that modules may allocate. Modules can also access DOS memory allocation functions. The dynamic memory requirements of the system modules need not be large (perhaps 2K bytes). Functions are also available to do block copies and clears.

QUEUE MANAGEMENT—The KERNEL 40 provides some queue management functions such as INIT, INSERT, REMOVE, LINK, etc. The queues reside in memory provided by the module (this memory may, in turn, have been requested from the Executive System 1).

TIMER MANAGEMENT—The KERNEL 40 provides services for background activation, periodic activation, and timeout processing.

INTERRUPT MANAGEMENT—The KERNEL 40 provides hardware interrupt services. These functions allow a module to define an Interrupt Service Routine (ISR) to be activated by the kernel when a particular device posts an interrupt. The ISR executes with its own data segment and a special stack segment used only for interrupts. The kernel takes care of any interrupt overhead (saving the cpu state, issuing EOI, etc.).

CONFIGURATION INFORMATION—The KERNEL 40 also provides the before-described result of device independence. It does this by passing commands to the proper hardware driver module to execute the command in a way that is consistent with other modules of that service class. For example, the command to play forward for the videodisc player service class 24, FIG. 4, is implemented for all supported players such that the command appears to execute in a consistent way fromplayer to player. The application interface remains unchanging while the underlying hardware can be changed without undue consequence.

Not only is there device independence provided by the invention, thus, but a kind of overload or standard system independence as well, since there is interfacing with each of the "V:Link" 1602 and 1800 exemplary hardware of FIG. 3, the before-mentioned IBM Info-Window 2, FIG. 1A, etc. and the emerging European Standard MIC.

The before-described transparency to the user, moreover, occurs for the following reason. The IBM Info-Window emulator 2 (and the MIC system driver interface) allow the user to run applications that are designed for those environments to run on said Visage systems. The system translates the calls to these proprietary systems into calls to the executive system of the invention and executes them within the same. This, in some cases, provides a substantial advantage over the original system in that new hardware can be substituted transparently and the application will continue to run. The system of the invention, for example, supports a wide variety of videodisc players 4, FIG. 4.

In summary, therefore, the open architecture interactive video-audio-computer management of the present invention enables adding video, audio and other user input capabilities to a standard computer (PC, for example), dealing with complex data types and complex devices that require system resources which the invention allocates and supports; providing such functionality in an automatic manner transparent to the user and in an environment where the operating system does not provide those capabilities, such that there are otherwise no fixed mechanisms or established procedures for resolving such issues.

Within the context of trying to maximize the open architecture usability, not just an individual function that can be exhibited in a special situation, such transparency to the user of certain configuration issues has been admirably provided. Also, to the program developer to a lesser degree, but to a greater degree than in prior devices, one of such transparencies involves the problem of configuring for peculiar hardware requirements. In the hardware of the invention, there is provided some capacity to be dynamically configured by the system software to use different interrupt resources, different DMA resources, or in at least one case, different I/O address resources not based on the hardware jumpers that are usually required, but based rather upon actions of the system software. This has been complemented with a piece of system software that runs automatically to determine what other devices present in the system and over which there is no control, might have potential conflicts with needed resources. A configuration is then evolved which will schedule the use of available resources only; and this happens completely automatically with no complicated analysis, examination of jumpers, taking apart of the systems, or for that matter, any software interventions of which the user is consciously aware.

Further, for the purpose of maximizing the available memory and therefore the range of applications which can be performed on the system of the invention while minimizing the time delays in operating and maximizing the utility of the system, a way has been provided for the software to be used by a particular application to be configured dynamically at the start of that application. Only those pieces that are needed pass through on an application basis. As the configuration information from each application becomes available, the required pieces of software are loaded into memory on a per application basis, without unnecessary pieces for an application occupying memory space.

Multiple simultaneous access is another feature wherein the system is able to offer a transparency not only downward to multiple devices, but upward to different forms of access to the same system. The ultimate application environment of the user is trying to operate courses or other interactive video software from multiple different vendors and making different assumptions about what the hardware might be as well as what the resources might be. The whole nature of the interface of the invention enables the user to invoke a program that was originally written to run on, for example, an IBM system, and have that run well; and then invoke another program that was designed to run on another system such as the said "V:Link" 1602 and 1800, and have that run well; and then switch over and invoke another program for a MIC system and have that run—all transparently and without any conscious actions on the part of the user, or unreasonable delays.

Further modifications will occur to those skilled in this art and such are considered to fall within the spirit and scope of the invention as defined in the appended claims.

What is claimed is:

1. A method of interactive video-graphics-audio-computer open architecture operation for providing multi-media command and application functions through specific requested application programs that control the operation of requested multi-media hardware devices of various types including video overlay devices, video/graphics display devices, video disc player products, audio recording and playback devices and computer user input devices, that comprises, providing a modular interface buffering software layer between the application programs and the operating hardware required for performing the same, including providing multi-media command and control functions that manage the control and presentation of multi-media data and storage and display for said application programs independently of the type of the requested hardware device and its data format;

optimizing the performance of such multi-media applications by interleaving data-intensive tasks, including loading graphics and audio files and dynamically loading at run-time only those descrete functions of multi-media command and control requested by the specific application programs under execution; and automatically selecting at run-time the hardware devices required to deliver the multi-media command and control functions requested, allowing the application program to be used with the hardware device requested without requiring any modification to the application software.

2. A method as claimed in claim 1 and in which said software schedules use only of said videodisc player products, communicates the input/output requirements, manages overlay of computer graphics files, and links to external software to incorporate these capabilities into such products.

3. A method as claimed in claim 1 and in which the step is performed of effecting said command and control functions with transparency to the user.

4. A method as claimed in claim 3 and in which the step is performed of configuring said software to provide not only universal videodisc player product control commands but also a universal set of X/Y input commands so as to allow device and product changes without specific application programs or changes.

5. A method as claimed in claim 4 and in which the step is performed of configuring said software to enable the simultaneous use of multiple devices.

6. A method as claimed in claim 4 and in which the step is performed of causing said software to provide commands not available on some videodisc player products which will work on all such players.

7. A method as claimed in claim 4 and in which the step is performed of causing said software to support one or more of digital audio facility, fast loading of high density graphics files, programming language interfaces, and support of PAL and NTSC videodisc players.

8. A system for interactive video-graphics-audio-computer open architecture operation for providing multi-media command and application functions through specific requested application programs that control the operation of requested multi-media hardware devices, having in combination with any of a myriad of such requested hardware devices including video disc players, graphic sources, audio and video sources, and computer input/output devices including touch screen devices, an executive system with multi-media command and control functions that manage the control and presentation of multi-media data and storage and display devices for application programs independently of the type of the requested hardware device and its data format, providing a virtual device interface with said hardware device that enables the performance of requested specific applications thereby and comprising a modular interface buffering software layer between the application programs and the operating hardware device required for performing the same, including means for establishing discrete modules of function of multi-media command and control requested by the specific application programs;

means for dynamically loading those discrete modules of function at run-time;

said software including means for restricting such loading to substantially only the functionality required to run the specific requested application; and means for enabling the software dynamically to reconfigure itself by scheduling the use only of said specific application programs to the different hardware devices connected to the system to control requested hardware devices including the videodisc players, to communicate the input/output requirements, to manage overlay of graphics, and to link to external software to incorporate such capabilities into the hardware devices and without requiring modification to the applications software.

9. A system as claimed in claim 8 and in which means is provided within the software to effect the interfacing and control with transparency to the user.

10. A system as claimed in claim 9 and in which means is provided to generate not only universal videodisc player control commands but also a universal set of X/Y input commands so as to allow product changes without specific application programs or changes.

11. A system as claimed in claim 10 and in which the software further enables the simultaneous use of multiple products.

12. A system as claimed in claim 10 and in which said software enables commands not available on some videodisc player which will work on all such products.

13. A system as claimed in claim 10 and in which said software supports one or more of digital audio facility, fast loading of high density graphics files, programming language interfaces, and support of PAL and NTSC videodisc players.

14. A system as claimed in claim 10 and in which the system software comprises a two-dimensional matrix of executive file modules, each capable of communicating similarly with any other module, and with each row representing a layer of functionality, and with the highest row controlling the interface with other programs and the lowest row controlling the particular product or device.

15. A system as claimed in claim 14 and in which the columns of the matrix of modules represent different service classes individually selectable in accordance with the specific desired application, and the matrix rows are logical layers of functionality.

16. A system as claimed in claim 15 and in which the service classes modules include one or more of system overlay, videodisc player, X/Y input commands, image and digital audio services.

17. A system as claimed in claim 16 and in which the said logical layers of functionality in the successive matrix module rows include one or more of a kernel module, class manager modules, device manager modules and device driver modules.

18. A system as claimed in claim 17 and in which said kernel module is provided with memory, queue management, realtime event services, configuration information, interrupt services, communication and device information, and the same further communicates with the application program, dispatching requests to said class manager modules.

19. A system as claimed in claim 18 and in which said class manager modules pass the requests from the application to lower modules in the matrix.

20. A system as claimed in claim 19 and in which the said image services class manager module also provides the function of reading and writing image disc files.

21. A system as claimed in claim 19 and in which said device manager modules are connected to communicate with specific external devices including said videodisc players, touch screens, mouse devices and link processors.

22. A system as claimed in claim 21 and in which said device driver modules are connected to control specific internal devices including communication ports, graphic adapters and link processors through I/O and memory mapped registers and interrupts.

* * * * *